(12) United States Patent
Ferguson et al.

(10) Patent No.: US 12,424,798 B2
(45) Date of Patent: Sep. 23, 2025

(54) OUTLET IN-RUSH CURRENT LIMITER FOR INTELLIGENT POWER STRIP

(71) Applicant: Vertiv Corporation, Westerville, OH (US)

(72) Inventors: Kevin R. Ferguson, Dublin, OH (US); Casey Gilson, Omaha, NE (US); Scott Cooper, Lincoln, NE (US); Jason Armstrong, Lincoln, NE (US)

(73) Assignee: Vertiv Corporation, Westerville, OH (US)

( * ) Notice: Subject to any disclaimer, the term of this patent is extended or adjusted under 35 U.S.C. 154(b) by 400 days.

(21) Appl. No.: 18/198,504

(22) Filed: May 17, 2023

(65) Prior Publication Data

US 2023/0396026 A1 Dec. 7, 2023

Related U.S. Application Data

(60) Provisional application No. 63/349,385, filed on Jun. 6, 2022.

(51) Int. Cl.
*H02H 9/00* (2006.01)
*H01R 13/24* (2006.01)
(Continued)

(52) U.S. Cl.
CPC ..... *H01R 13/6683* (2013.01); *H01R 13/2492* (2013.01); *H02H 3/093* (2013.01); *H02H 9/002* (2013.01)

(58) Field of Classification Search
CPC .......... H02H 9/02; H02H 9/002; H02H 9/001; G06F 1/30; G06F 1/305
See application file for complete search history.

(56) References Cited

U.S. PATENT DOCUMENTS 6,094,092 A 7/2000 Mizuno et al.
6,826,036 B2 11/2004 Pereira
(Continued)

FOREIGN PATENT DOCUMENTS

| EP | 2404354 B1 | 11/2018 |
|---|---|---|
| JP | 2011019318 A | 1/2011 |
| JP | 2018513666 A | 5/2018 |

OTHER PUBLICATIONS

Extended European Search Report dated Oct. 25, 2023; European Application No. 23177149.4.
(Continued)

*Primary Examiner* — Vanessa Girardi
(74) *Attorney, Agent, or Firm* — Suiter Swantz IP

(57) ABSTRACT

The present disclosure is directed to a rack power distribution unit (RPDU) that automatically and safely switches power to one or more receptacles. The RPDU includes one or more processors utilizing control algorithms that manage bistable relays so that in-rush current is minimized upon manual connection/disconnection of power to a load device. In particular, relay contact status (open/closed) is identified based on changes in RMS or peak voltage influenced by the load impedance. The RPDU is also configured to predict timings for voltage zero-crossing events. In this manner, and based on the determination of relay contact status and voltage zero-crossing prediction, open relay contacts are identified and safely closed at voltage zero-crossing.

20 Claims, 8 Drawing Sheets

(51) Int. Cl.
*H01R 13/66* (2006.01)
*H02H 3/093* (2006.01)

(56) References Cited

U.S. PATENT DOCUMENTS

| | | |
|---|---|---|
| 7,633,728 B2 | 12/2009 | Parker et al. |
| 7,738,221 B2 | 6/2010 | Kojovic et al. |
| 8,154,841 B2 | 4/2012 | Allen et al. |
| 8,639,459 B1 * | 1/2014 | Morales ................. G01R 21/00 |
| | | 702/62 |
| 8,884,467 B2 | 11/2014 | Lundqvist |
| 9,793,716 B2 | 10/2017 | Shuey |
| 9,952,261 B2 * | 4/2018 | Ewing .................... G01R 21/10 |
| 10,250,032 B2 * | 4/2019 | Ferguson ................. H02J 3/00 |
| 10,459,464 B2 * | 10/2019 | Jiang ........................ H02J 3/00 |
| 10,566,787 B2 | 2/2020 | Rodrigues et al. |
| 10,667,823 B2 * | 6/2020 | Goldfarb .............. A61B 17/068 |
| 10,677,823 B2 | 6/2020 | Ferguson |
| 10,777,997 B2 | 9/2020 | Fischer et al. |
| 2003/0235017 A1 | 12/2003 | Liu |
| 2014/0144897 A1 | 5/2014 | Stava et al. |
| 2019/0058354 A1 | 2/2019 | Sorenson |
| 2020/0059088 A1 | 2/2020 | Ferguson |

OTHER PUBLICATIONS

Japanese Patent Office, Office Action received in JP Application No. 2023-092592, May 8, 2024, 4 pages.

\* cited by examiner

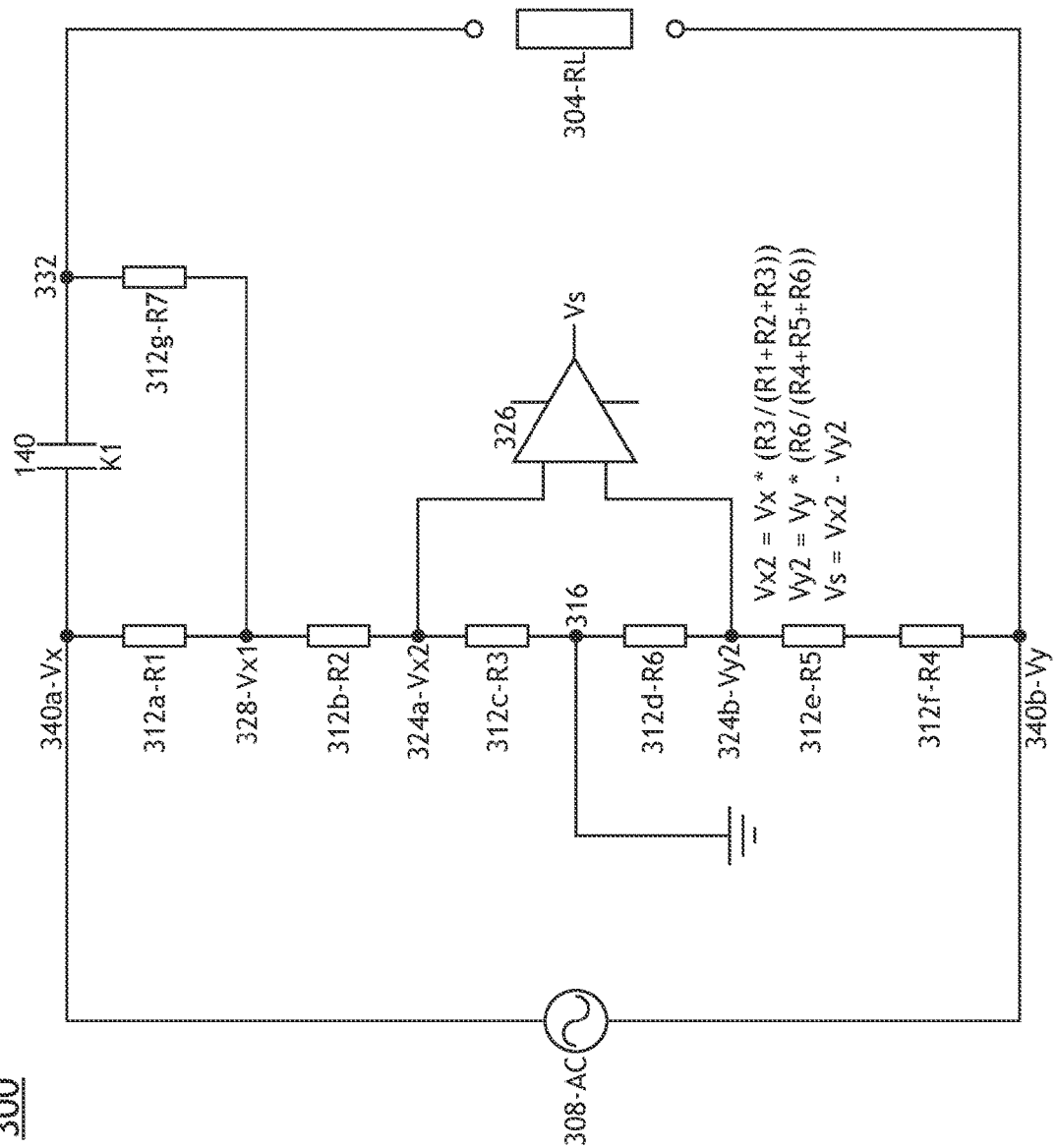

OUTLET IN-RUSH CURRENT LIMITER FOR INTELLIGENT POWER STRIP

CROSS REFERENCE TO RELATED APPLICATIONS

The present application claims the benefit under 35 U.S.C. § 119(e) of U.S. Provisional Application Ser. No. 63/349,385, filed Jun. 6, 2022. The U.S. Provisional Application Ser. No. 63/349,385, filed Jun. 6, 2022, is incorporated herein by reference in its entirety.

TECHNICAL FIELD

The present disclosure relates to intelligent power strips with multiple outlets and bistable relays, and more particularly to an intelligent power strip which is configured to limit in-rush current as external devices are being connected and disconnected to the intelligent power strip while the outlets are turned on.

BACKGROUND

Intelligent power strips, such as those used for server clusters, often use power relays, typically rated 250V/20 Amps, to switch a line of a receptacle for the main purpose of rebooting a connected load device, such as a server. Depending upon the internal power supply design of the load device, substantial in-rush currents may occur while input bulk capacitors charge up the moment the relay contacts are closed. This brief, but large current surge, can permanently damage the relay contacts. For example, the in-rush currents may weld the relay contact closed so that the relay contact is no longer operative. These high-energy events may even cause explosive expansion and ejection of molten metal, possibly leading to secondary arcing faults within the chassis. In-rush currents may also cause the upstream circuit protection device, typically a circuit breaker, to trip. Some relay manufacturers offer more expensive devices that can handle momentary current surges up to four times their design rating. To further supplement the protection of the relay contacts, the in-rush currents can be mitigated by coordinated timing of relay closure according to the voltage zero-crossing of line frequency.

A type of Intelligent power strip commonly referred to as rack power distribution units (RPDUs), used in racks that hold server equipment, have switching capabilities associated with multiple receptacles. A reason for the switching capabilities has been two-fold: (a) to be able to remotely recycle power to a connected equipment that is hung up; and (b) to be able to sequentially start up all connected equipment to ensure that upstream breakers do not trip due to all connected loads drawing high in-rush currents concurrently. Typical IT (information technology) loads, for example servers, can draw as much as 5 times their normal current at the time of startup.

Bistable relays are increasingly being used in RPDUs as they are more energy efficient, because their coils do not need to remain energized to maintain the state of their contacts. In such a bistable relay, the coil is pulsed to change the state of the contacts from open to closed and vice-versa. The contacts will then remain in their existing state until the coil is pulsed again. In contrast, in a typical normally open relay, when it is desired to close the contacts of the relay, the coil of the relay must be energized and kept energized to keep the contacts closed. When the coil of the typical normally open relay is de-energized, the relay contacts revert to their normally open state. Similarly, in a typical normally closed relay, when it is desired to open the contacts of the relay, the coil of the relay must be energized and kept energized to keep the contacts open. When the coil of typical normally closed relay is de-energized, the relay contacts revert to their normally closed state.

RPDUs with switching capabilities are particularly useful in managing in-rush current during power cycle and circuit breaker closures, where they can be programmed to sequence power to each receptacle in a prescribed time. However, RPDUs currently are unable to mitigate potential in-rush current in situations where a user manually connects and/or disconnects the load while a receptacle is powered. Complicating matters is the inability of these systems to indicate whether a load device is connected or disconnected when the relay contacts are open. These limitations within the RPDUs for detecting load connectivity and in-rush current can lead to high-energy events as listed above.

Therefore, it may be advantageous for a system and method to remedy the shortcomings of the conventional approaches identified above.

SUMMARY

Accordingly, the present disclosure is directed to a rack power distribution unit (RPDU) that automatically and safely switches power to one or more receptacles. The RPDU includes one or more processors utilizing control algorithms that manage bistable relays so that in-rush current is minimized upon manual connection/disconnection of power to a load device. In particular, relay contact status (open/closed) is identified based on changes in RMS or peak voltage influenced by the load impedance. The RPDU is also configured to predict timings for voltage zero-crossing events. In this manner, and based on the determination of relay contact status and voltage zero-crossing prediction, open relay contacts are identified and safely closed at voltage zero-crossing.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures.

FIGS. 3A, 3B, and 3C are schematic diagrams of a load detection circuitry under different load and relay conditions, in accordance with one or more embodiments of the disclosure.

DETAILED DESCRIPTION

Figure 1:
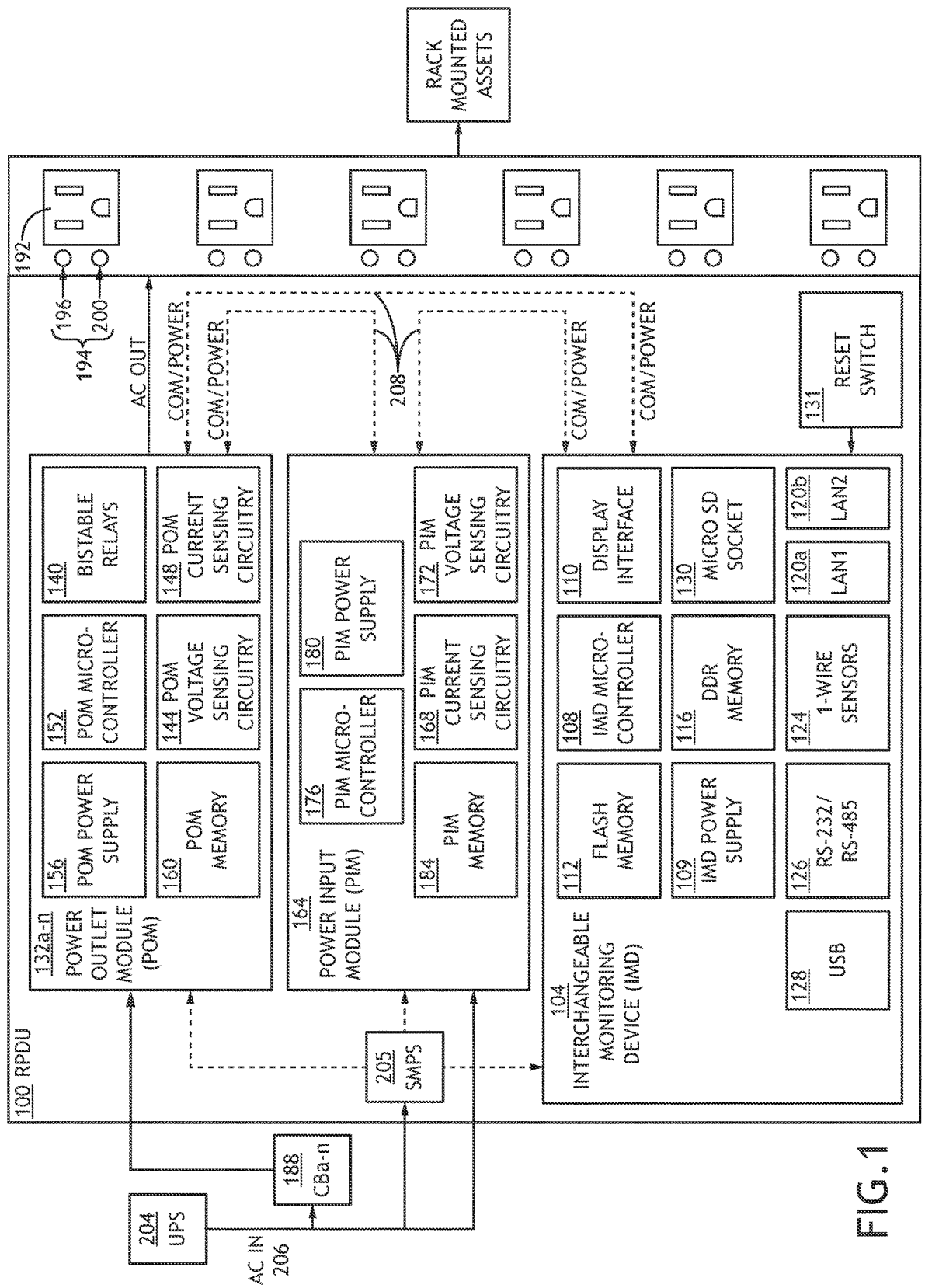
FIG. 1 is a block diagram illustrating a rack power distribution unit (RPDU), in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "embodiments" means that a particular element, feature, structure, or characteristic described in connection with the embodiment is included in at least one embodiment disclosed herein. The appearances of the phrase "in embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

The present disclosure is directed to a rack power distribution unit (RPDU) that automatically and safely switches power to one or more receptacles. The RPDU includes processors utilizing control algorithms that manage bistable relays so that in-rush current is minimized upon manual connection/disconnection of power to a load device. In particular, relay contact status (open/closed) is identified based on changes in RMS or peak voltage influenced by the load impedance. The RPDU is also configured to predict timings for voltage zero-crossing events. In this manner, and based on the determination of relay contact status and voltage zero-crossing prediction, open relay contacts are identified and predictively closed at voltage zero-crossing.

Referring to FIG. 1, FIG. 1 a block diagram illustrating a rack power distribution unit (RPDU), in accordance with one or more embodiments of the present disclosure, is shown. The RPDU 100 may include an interchangeable monitoring device (IMD) 104. For example, the IMD 104 may be configured as a hot-swappable web card which is installed in the RPDU 100. The IMD 104 may include one or more IMD microcontrollers 108, an IMD power supply 109, a display interface 110, and also a non-volatile (NV) memory in the form of flash memory 112 and/or DDR memory 116. The IMD 104 may also include a plurality of ports including, but not limited to, one or more LAN Ethernet ports 120a-b, one or more 1-wire sensor ports 124, an RD-232/RS-485 port 126, a USB port 128, and a microSD socket 130. The IMD may be coupled to a reset switch 131 for enabling a user to initiate a hard reset to the IMD, the RPDU 100 and/or other subsystems within the RPDU 100. The IMD 104 may also communicate with other RPDU componentry via an RS-485 physical layer.

The RPDU 100 further includes one or more power output modules (POM) 132. Each POM 132 may include a POM microcontroller 152 and a plurality of bistable relays 140. The POM microcontroller 152 may perform several functions including detecting open circuit breakers, controlling bistable relays 140, measuring voltages and currents, and calculating energy metering data for each receptacle. The POM may further include POM voltage sensing circuitry 144, POM current sensing circuitry 148, one or more POM microcontrollers 152, a POM power supply 156, and a POM memory 160.

The IMD 104 may serve as the monitoring host controller for the RPDU 100, and may be in constant communication with the POM 132. By communicating with the POM 132, the IMD 104 may provide a means for the user to enable or disable one or more features of the RPDU 100, as well as acquire and display status information. In embodiments, the IMD 104 does not directly sense the receptacle voltage and/or execute connection or disconnection algorithms (e.g., the voltage sensing and execution may be performed by the POM 132).

The RPDU 100 further includes a power input module (PIM) 164 communicatively coupled to the POM 132 and the IMD 104 (e.g., via the aforementioned RS-485 physical layer). The PIM 164 measures input voltages and input currents and calculates energy metering data for the inputs and branch circuits of the RPDU 100. The PIM 164 may detect and measure voltages and currents via a sensing subsystem. For example, the PIM 164 may include PIM current sensing circuitry 168, and PIM voltage sensing circuitry 172. The PIM 164 may also include one or more PIM microcontrollers 176, a PIM power supply 180, and a PIM memory 184. The PIM 164 and the POM 132 may both communicate with the IMD 104 via an RS-485 physical layer and/or other proprietary protocols (e.g., communication interface). For example, the IMD 104 communicates with PIMs 164 and POMs 132 to get their metering data, and for POMs 132, to effectively control the outlet power relay state.

Although FIG. 1 presents the IMD 104, the POM 132 and the PIM 164 as separately defined components of the RPDU 100, the IMD 104, the POM 132 and/or the PIM 164 may include one or more, or all, components of the IMD 104, the POM 132 and/or the PIM 164, and may perform one or more, or all, functions of the IMD 104, the POM 132 and/or the PIM 164. Therefore, the above description should not be interpreted as a limitation on the embodiments of the present disclosure but merely as an illustration.

FIG. 1 also shows a plurality of branch circuit breakers (CB) 188. By "branch" circuit breaker it is meant that each of the CBs 188 is uniquely associated with one specific POM 132. Each POM 132 includes a plurality of bistable relays 140, which in one specific embodiment comprise six (6) bistable relays. However, it will be appreciated that a greater or lesser number of bistable relays 140 may be provided per branch. Mechanical bistable relays 140 have coils and contacts, and may be configured as single coil or dual coil relays. More than one CB 188 may exist for each POM 132. For example, each POM 132 can have its bistable relays 140 arranged in two sub banks, with a separate CB 188 associated with each sub-bank. As used herein, each sub-bank of a POM 132 may be considered a branch of the POM 132.

FIG. 1 also shows a plurality of AC power receptacles 192. Each AC power receptacle 192 may have an optical element set 194 that may include a first associated optical element 196 and a second optical element 200. For example, the first associated optical element 196, may each be configured as an LED having a first color, for example green, that indicates a status of the specific bistable relay 140 associated with its specific AC receptacle 192. The second associated optical element 200 may be configured as an LED having a different color than the first associated optical element 196, for example red, for providing additional information to the user. For instance, each one of the green LEDs may indicate, for example, that the bistable relay 140 associated with that specific AC receptacle 192 is closed, and an extinguished green LED would therefore indicate that the associated bistable relay 140 is open. Input power to the RPDU 100 may be from an uninterruptible power supply (UPS) 204, a switched-mode power supply (SMPS) 205, an AC in line 206 or from any other AC power source. The optical elements 196, 200 may indicate different events, statuses and/or characteristics of the specific bistable relay, and the RPDU 100 may be configured to include multiple sets of associated optical elements 196, 200.

The PIM 164 may perform real time RMS voltage measurements and RMS current measurements, and thus monitor the power input from the AC power source. The monitored power information may be shared with the other components of the RPDU 100. The PIM 164 may receive an input current signal from each of the POMs 132 which it uses to perform its current sensing function. Each POM 132 may also include a plurality of current transformers (CTs) for independently measuring a current being drawn by the AC receptacles 192 associated with each branch of bistable relays 140.

The IMD 104 shown in FIG. 1 manages, monitors and reports information about RPDU 100 energy metering and power distribution status obtained from the PIM 164 to networked software clients. The PIM 164 provides support for the energy metering measurements and calculations, control management, and communications interfaces to the IMD 104, as described above. The IMD 104 communicates with each POM 132 and, except upon power loss, effectively controls the bistable relays 140 of each POM 132 by sending command messages to each POM 132 to independently control each one of its associated bistable relays 140 (e.g., the IMD 104 commands the POM 132 to configure the relay state).

The POM 132 directly controls its bistable relays 140 via the microcontroller 152. The POM 132 may also sense individual receptacle operational status, and loss of an AC input power signal via line frequency monitoring, and detect an open circuit breaker condition. For example, the bistable relays 140 of each POM 132 may be configured to require a nominal 16 msec pulse to their coils to change states, that is, to open or close their contacts. A reference herein to a bistable relay 140 being "open" means that its contacts are open and power is off or interrupted at the receptacle 192 to which the bistable relay 140 switches power. As used herein, "power up", "power down", "power failure", and "power cycle" refer to specific conditions of input AC line voltage, which is the AC power provided to the receptacles 192 through the bistable relays 140 of each POM 132. The term "configured state", when used in connection with the bistable relays 140, means the state that a given bistable relay is configured to be in (i.e., open or closed) when power is on.

In embodiments, the IMD commands and receives energy metering data from the PIM 164 and the POM 132. The IMD 104 may also command the PIM 164 via communication bus 208, which in turn, may command the POM 132 via communication bus 208 to configure the relay state of each bistable relay 140. For example, the IMD 104 may act as a bus master, connected to both the PIM 164 and the POM 132, with the PIM 164 and the POM 132 not directly interacting with each other. However, in some embodiments, the PIM 164 may directly interact with the POM 132. In embodiments, the PIM 164 is capable of autonomous behavior without IMD 104 commands. The one or more POMs 132 each may also be capable of autonomous behavior without PIM 164 commands.

Figure 2:
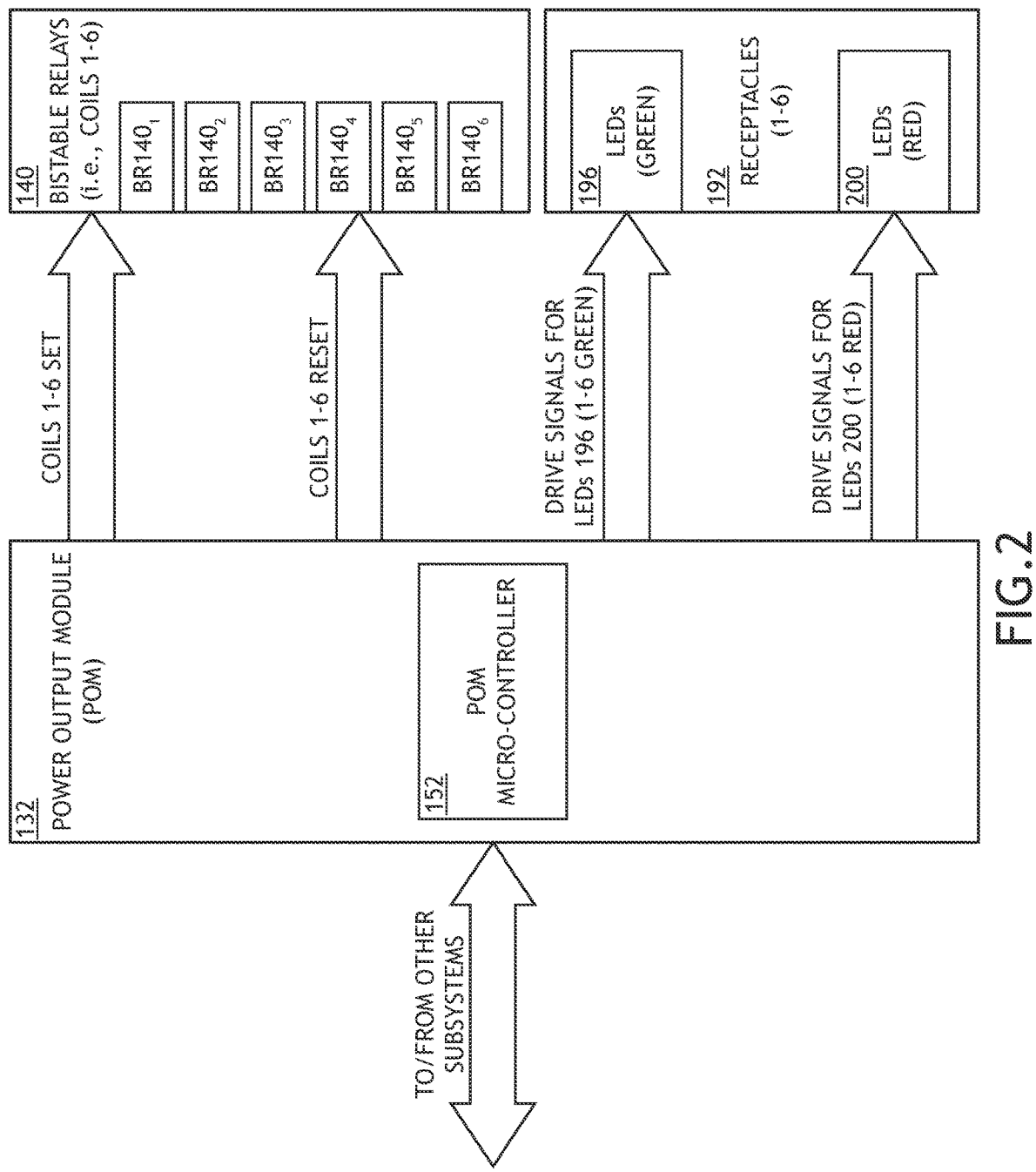
FIG. 2 is a block diagram illustrating a power output module coupled with bistable relays, in accordance with one or more embodiments of the present disclosure.

Referring to FIG. 2, a block diagram illustrating a power output module coupled with bistable relays, in accordance with one or more embodiments of the present disclosure, is shown. In this example, six bistable relays $140_1$-$140_6$ are shown, but it will be appreciated that the RPDU 100 may control a greater or lesser number of bistable relays 140. The POM microcontroller 152 of POM 132 may include a serial interface (SPI) that manages communications with other subsystems of the POM microcontroller 152. The POM microcontroller 152 includes suitable logic for generating signals to independently command the bistable relays 140 to each assume a first state ("SET" signals) or a second state ("RESET" signals). The POM microcontroller 152 also includes logic for controlling the optical element set 194 (e.g., the green LEDs and/or the red LEDs. For example, the microcontroller may control the green LEDs so that the green LEDs flash at a first rate when a given bank of bistable relays 140 is drawing a current which is close to an upper predetermined current limit. In another example, the POM microcontroller 152 may control the green LEDs so that the green LEDs flash at a second rate different from the first rate (e.g., faster rate) when an overcurrent condition arises (i.e., a given bank of bistable relays 140 is drawing more current than allowed). In another example, the POM microcontroller 152 may control the red LEDs so that all of the red LEDs stay illuminated continuously if an over-current condition arises where a given bank of bistable relays 140 is drawing more current than allowed. In another example, the red LEDs may also be controlled to flash or pulse if an open circuit board condition arises.

In some embodiments, the POMs 132, the POM voltage sensing circuitry 144 and the POM current sensing circuitry 148 monitor loss of line frequency on load sides of the respective CB 188 for each of the POMs 132. For example, each POM 132 may allow for two sub-banks of power distribution and the AC power feed can be either same or differently phased. In another example, each sub-bank of bistable relays 140 may optionally have its own microcontroller 152.

Each of the one or more POMs 132 infers imminent power loss by detecting a loss of line frequency of the AC line signal from the AC power source. Each POM 132 monitors the line frequency and sets true loss of line frequency status after a short period during which less than the expected number of detected voltage zero crossing transitions of the AC line signal has occurred. A true loss of line frequency is defined to be when less than three (3) zero voltage transitions or zero crossings occur over a 32.768 ms interval, satisfying both 50/60 Hz operation. The voltage zero-crossing detection hardware of the POM 132 has built-in hysteresis and digitizes the line frequency. The digitized line frequency is provided to the POM 132 that uses digital filtering for reliable triggering. In this regard, the POM 132 counts zero-crossing voltage transitions to make this determination. The number of transitions allows for a single worst case % cycle delay for zero crossing.

The detection period for detecting loss of line frequency must be small so that the relay coil voltage of each bistable relay 140, derived from the SMPS 205 which is powering the entire system (i.e., the PIM 164, the POM 132 and the IMD 104), is maintained sufficiently long enough (typically about 16 ms) for the POM 132 to pulse the bistable relays 140 that need to be opened into the open state. At a worst case, fully loaded condition (i.e., powered at 70 VAC and IMD 104 fully operational) there is approximately 64 ms of power supply hold time.

In some embodiments, the POM 132 does not distinguish between power loss due to loss of line power or due to CB 188 open conditions. Therefore, upon power loss, the POM 132 controls all the bistable relays 140 in the affected sub-bank so that their contacts are switched to (or left in) the open condition. That is, upon power loss (e.g., determined by a sudden loss of current RMS and/or peak over N cycles), the POM 132 opens the bistable relay contacts that are closed and leaves open the bistable relay contacts that are open.

In some embodiments, a commanded state of a receptacle 192 overrides autonomous power-up state behavior. For example, if during a power-up cycle a power-up delay for a receptacle 192 is pending due to the sequencing of closing the bistable relays 140 that are to be closed, a separate command to power on a receptacle may result in immediate processing closure of the bistable relay 140 for that receptacle.

At initial system startup, one or more CBs 188 may be manually tripped by a user to the open state before power is applied. This results in the IMD 104, upon power-up, autonomously commanding the affected POMs 132 to control all the bistable relays 140 to be open immediately to mitigate in-rush currents. Afterwards, the IMD 104 queries each POM 132 to confirm that all of its bistable relays 140 are open and, if they are, alerts a user that the CBs 188 for that POM 132 may then be closed. The LED 196 associated with each receptacle 192 may be turned on (e.g., illuminated) when the bistable relay 140 for that receptacle is then closed, and is turned off when the bistable relay for that receptacle is open. Although the bistable relays 140 would typically be set to the default "open" position at manufacturing time, the occurrence of excessive shock or vibration during transportation and/or installation may cause a change in state. If for the same POM 132, one CB 188 is detected to be closed at line power loss (i.e., true loss of line frequency), all bistable relays 140 are set to their configured receptacle 192 power up state by the IMD 104. That is, the bistable relays 140 that are in a closed state at line power loss are set to be re-closed upon power up, and the bistable relays 140 that are in an open state are set to remain open upon power up. If for the same POM 132, both CBs 188 are detected open at line power loss (true loss of line frequency), all the bistable relays 140 are controlled by the IMD 104 so that all of these bistable relays 140 remain open at power up until the CBs 188 are closed. Upon the CBs 188 being closed, the IMD 104 proceeds as discussed above during initial system start up. Then upon confirming that all the bistable relays 140 of a POM 132 are open, the IMD 104 then proceeds to command the POM 132 to close the bistable relays 140 that are to be closed, which the IMD 104 may do sequentially as discussed below. If the power supply of the IMD 104 fails, the IMD 104 and the POMs 132 no longer operate; however, the bistable relays 140 remain in their last configured states, even during subsequent power cycle(s). In this aspect, the power supply of the IMD 104 provides power to the POM 132.

In some embodiments, the current bistable relay 140 states are immediately updated in the volatile register memory (not shown) of the POM 132 when configured by the IMD 104 and/or when autonomously changed by the POM 132, and the volatile register memory can be read by the IMD 104 from each POM 132. The IMD 104 then updates the states for those bistable relays 140 stored in flash memory 112 or DDR memory 116 of the IMD 104.

In some embodiments, except in the event of a power loss where all the closed bistable relays 140 of each affected sub bank of each affected POM 132 are opened, only a single bistable relay state per branch of a POM 132 is permitted to change per N line cycles to mitigate in-rush currents and prevent the CB 188 associated with that particular branch from unexpectedly opening or tripping. For example, during a power up cycle of an affected branch of a POM 132, the IMD 104 determines which bistable relays 140 of that affected branch are to be closed. It then sequentially sends commands to the POM 132 to close those bistable relays 140, one command for a different bistable relay every N line cycles. That is, the IMD 104 sends the POM 132 a command to close one of the bistable relays 140 that are to be closed every N line cycles. This results in one such bistable relay 140 being closed every N line cycles. It should be understood that the flash memory 112 or DDR memory 116 of the IMD 104 is used by the IMD 104 to store the real time configured states of all the bistable relays 140 of all the POMs 132. The IMD 104 then determines which bistable relays of an affected branch of an affected POM 132 are to be closed during a power-up cycle based on the stored configured states.

The POM 132 may have an all-digital phase-locked loop implemented in firmware. For example, the POM 132 may operate to lock onto the line frequency and precisely coordinate analog-to-digital conversion processes for voltage and current measurements. The POM 132 may also close its associated bistable relays 140 according to a synchronized timing to a minimum voltage, which will be at the zero crossing of line frequency, to mitigate in-rush current. The IMD 104 and/or POM 132 may synchronize to both line-neutral and line-line voltages. The POM 132 may open its associated bistable relays 140 (e.g., with or without a command form the IMD 104), according to synchronized timing to minimum current zero crossing of line frequency to minimize contact arcing.

The open and close timings of the bistable relays 140 may be measured during manufacturing functional testing and saved to non-volatile memory, such as the non-volatile memory of the POM 132. It should be understood that these timings could be saved to the non-volatile memory of the POM 132 and alternatively or additionally retrieved by the IMD 104 as needed. In some embodiments, the POM 132 may share timing information (e.g., open timings and close timings) with the IMD 104. It will also be understood that the bistable relays 140 have an inherent delayed response until release/open states are achieved because of the operate/release times of the coil. These timing values are used by the POM 132 to compensate the command execution timing to better synchronize the actual open/close states according to arrival of the voltage and current zero crossing states. For example, if a particular bistable relay 140 was measured to have a 9 msec close time, when the IMD 104 is sending a command to the POM 132 having that bistable relay 140, to cause it to close, the IMD 104 does so 9 msec before the next zero voltage line crossing point.

The POM 132 may also compensate for relay contact bounce by commanding the closure state ~1 msec earlier so that a typical 1-2 msec contact bounce occurs around line voltage zero-crossing point. In the foregoing example of the bistable relay 140 having a 9 msec closure time, the POM 132 (e.g., with or without a command form the IMD 104) closes the bistable relay 140 10 msec in advance of the next voltage zero-crossing point.

It should be understood that the IMD 104 commands POM 132 to switch on and off the power to the receptacle per user request and/or to allow a user to program a desired startup sequence for output power turn on. However, the IMD 104 may not directly manage the logic to coordinate these activities. For example, the IMD may not precisely control the power relay open and close timings directly as the IMD 104 lacks a deterministic real-time operating system. Rather, the POM 132 may manage the logic directly to switch the power relay on and off from either IMD 104 command or autonomously according to the inrush current mitigation algorithms described herein from code executing on the POM microcontroller 152. The POM 132 communicates the actual power relay state back to IMD 104 so that the IMD 104 can report outlet power status to the user via monitoring protocols and/or web interface.

The IMD 104 may also report an abnormal operating condition when a bistable relay 140 is commanded to be opened but current is still measured flowing through it. Each receptacle 192 may have one of the current transformers associated with it that is used to measure current being drawn by the receptacle. This abnormal condition may result from failed or stuck closed relay contacts. The POM 132 may determine whether such an abnormal operating condition exists from the currents being measured by its current transformers and may communicate this abnormal condition to the IMD 104.

As shown in the drawings, the IMD 104, PIM 164, and the POM 132 include the IMD microcontroller 108, the PIM microcontroller 176 and the POM microcontroller 152, respectively, but only the POM microcontroller 152 includes appropriate logic for implementing the above-described logic functions. It should be understood that other types of devices can be used such as a digital processor (DSP), microprocessor, microcontroller, Field Programmable Gate Array (FPGA), or application specific integrated circuit (ASIC). When it is stated that IMD 104, PIM 164 or POM 132 have logic for a function, it should be understood that such logic can include hardware, software, or a combination thereof, including the logic implemented in the microcontrollers.

As described above, the RPDU 100 manages in-rush current during power cycle and circuit breaker closure in a controlled fashion. The RPDU 100 also mitigates in-rush current that can occur in situations where the user manually connects or disconnects load while the receptacle is powered. Such mitigation requires the RPDU 100 to predict zero crossings and operate relays to coordinate during a predicted zero-crossing event. The mitigation also requires an ability for the RPDU to automatically detect when a load is connected or disconnected, whether the relay contact is open or closed. The detection of load status in either open or closed relay contacts is facilitated by voltage sensing circuitry within the POM 132 having embedded firmware comprising control algorithms to determine the presence of load under open and closed relay contacts. The control algorithms may also be used to predict future voltage zero-crossings.

Figure 3A:
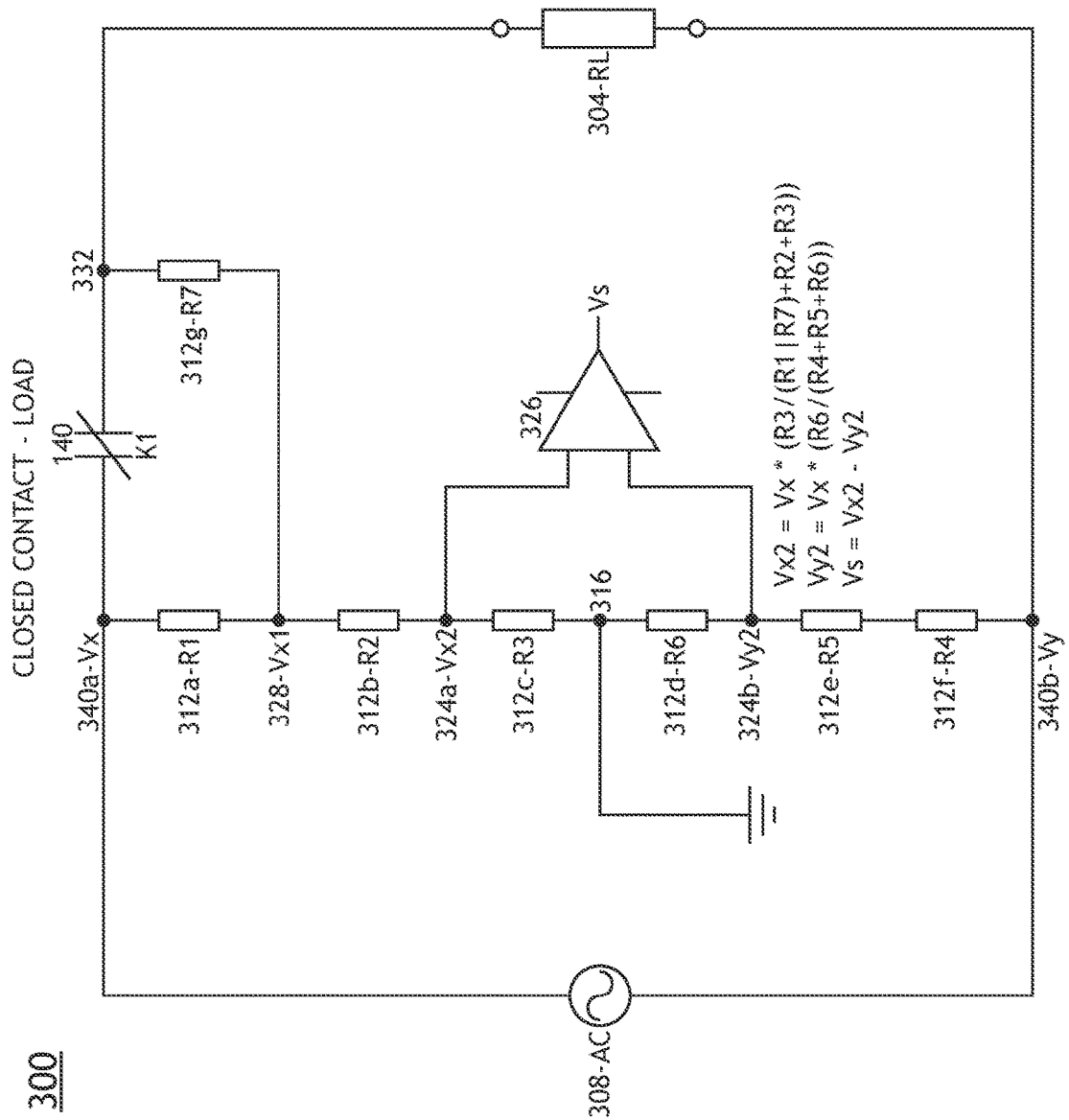
Figure 3B:
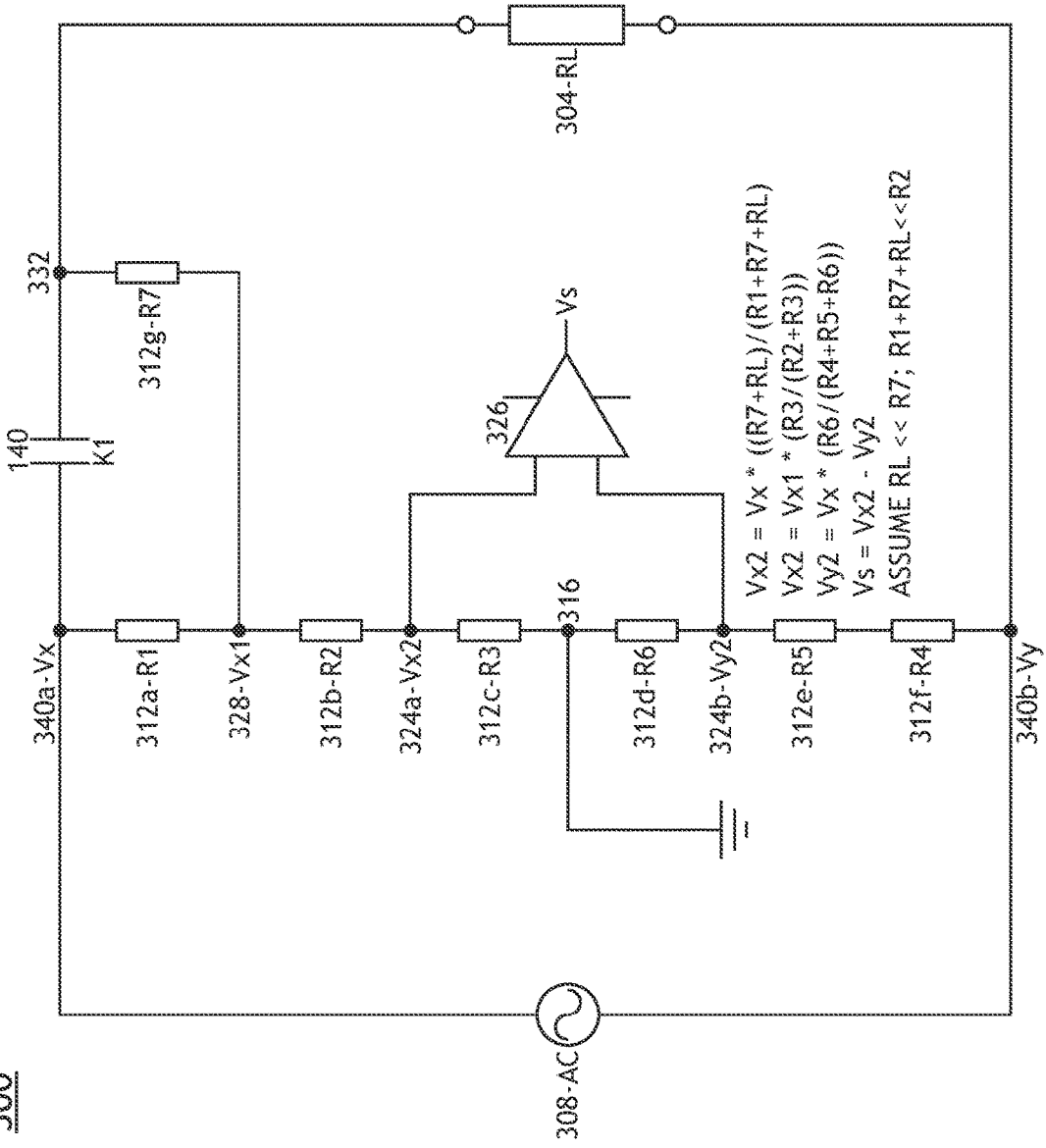

Referring to FIGS. 3A, 3B and 3C, schematic diagrams of a load detection circuitry under different load and relay conditions, in accordance with one or more embodiments of the disclosure, are shown. The schematic diagrams of a load detection circuitry 300 under different load 304 and relay 140 conditions are shown, wherein the load detection circuitry 300 may be configured to determine if a load 304 is connected or disconnected.

The load detection circuitry 300 may be disposed within any componentry of the RPDU 100, including but not limited to, the POM 132 or the IMD 104. The load detection circuitry 300 may include the relay 140, the AC power source 308 (e.g., from the AC power receptacles 192). The load detection circuitry 300 further includes a series of resistors 312$a$-$g$ with respective known resistances R1-R7, with resistors 312$a$-$f$ arranged in series. A ground lead 316 lead connected to the circuitry between resistors 312$c$ and 312$d$ leads to ground 320, whereas a pair of comparator leads 324$a$-$b$ connected between resistor pairs 312$b$, 312$c$ and 312$d$, 312$e$, lead to a difference amplifier 326. Resistor 312$g$ is arranged in parallel with resistor 312$a$, and electrically couples to circuitry at a connection 328 between resistors 312$a$ and 312$b$. Resistor 312$g$ also couples to the circuity at a connection 332 (e.g., the relay 140 is flanked on both sides by the connection 340$a$ and connection 332). The load 304 also has a known resistance (RL). The load impedance is unknown, but is sufficiently low enough to act as a short circuit relative to the high impedances of the circuit formed by resistors 312$a$, 312$g$.

The difference amplifier 326 is configured to receive voltages Vx2 and Vy2 from comparator leads 324$a$-$b$, respectively, and determine the voltage supply, Vs, based on the difference between Vx2 and Vy2. Once determined for different load 304 and relay conditions within the load detection circuitry 300, the Vs can then indicate whether the load 304 is connected or disconnected while the relay contact is open. Voltages Vx2 and Vy2 are determined based on a set of control algorithms that draw upon comparisons between the changes of voltage RMS and/or peak voltage measurements made within the load detection circuitry 300. These control algorithms allow the POM to detect and measure voltage differences under open contact/loaded, open contact/unloaded, closed contact/loaded, and closed contact/unloaded conditions. For example, for either loaded or unloaded conditions, impedance from the load 304 can cause small changes in voltage sensing resistors 312$a$, 312$g$ bridging an open contract of the relay 140. The following paragraphs describe three examples of how the Vs may be determined under different load 304 and relay conditions.

Under conditions where the load 304 is connected and the relay contact at the relay 140 is closed (e.g., as in FIG. 3A), the voltage at connector lead 324a (e.g., Vx2) may be determined based the following equation: (Vx2=Vx*(R3/((R1∥R7)+R2+R3))), with Vx indicating the voltage at connection 340a (i.e., a connection where one end of the series of resistors 312a-f connects at point in the circuitry between the AC power source 308 and the relay 140). The voltage at connector lead 324b (e.g., Vy2) may be determined based on the following equation (Vy2=Vy*(R6/(R4+R5+R6))), with Vy indicating the voltage at connection 340b (i.e., a connection where the other end of the series of resistors 312a-f connects at a point in the circuity between the AC power source 308 and the load 304). The voltage supply (Vs) can then be obtained (i.e., Vs=Vx2−Vy2) via the difference amplifier 326.

Under conditions where the load 304 is connected and the relay contact at the relay 140 is open (e.g., as in FIG. 3B), the voltage at connector lead 324a may be determined based the following equation: (Vx2≈Vx1*(R3/(R2+R3))), with Vx1 indicating the voltage at connection 328, which can be determined based on the following equation: (Vx1≈Vx*((R7+RL)/(R1+R7+RL))). The voltage at connector lead 312b may be determined based on the following equation: (Vy2=Vy*(R6/(R4+R5+R6))). The voltage supply (Vs) can then be obtained (i.e., Vs=Vx2−Vy2) via the difference amplifier 326.

Under conditions where the load 304 is disconnected and the relay contact at the relay 140 is open (e.g., as in FIG. 3C), the voltage at connector lead 324a may be determined based the following equation: (Vx2=Vx*(R3/(R1+R2+R3))). The voltage at connector lead 324b may be determined based on the following equation: (Vy2=Vy*(R6/(R4+R5+R6))). The voltage supply (Vs) can then be obtained (i.e., Vs=Vx2−Vy2) via the difference amplifier 326.

During initial power cycle at end-of-line factory testing, the power relay open and closed voltage measurements under no-load and load are functionally verified and establish the discriminating voltage basis for the control algorithm to process. These values may then be compared to currently determined Vs values to determine the load 304 and relay 140 conditions.

As mentioned herein, the control algorithms are used to coordinate with the line frequency to predict the precise timing of future voltage zero-crossings. When the load is detected and power relay programmed closed, then the control algorithm commands the relay to close in advance of the voltage zero-crossing, accounting for inherent delay of relay operate time, so the contact closes at the lowest instantaneous voltage (i.e., zero-crossing) for the lowest in-rush current. Relay operating time may also be measured during run time to increase the accuracy of future voltage zero-crossing predictions. This timing information is saved to a non-volatile memory 112, 116, 160, 184, and updated automatically and periodically as user input voltage supply conditions fluctuate and relay switching performance varies during temperature and product lifetime. For RPDU 100 models where the receptacle voltage can vary widely as its power service is purposely changed because of a detachable field supplied cable, the control algorithm must reestablish the discriminating voltage basis, so it assumes the receptacle is loaded and closes the power relay at voltage zero-crossing when it is first turned cony. The control algorithm will immediately switch off outlet power if no current draw is measured and from that point forward, the RPDU 100 is cognizant of the unloaded and loaded voltage operating conditions.

As stated above, the status of a relay contact may be indicated by an optical element 196, 200 within the optical element set. For example, the POM 132, based on the control algorithm, may trigger one of the optical elements 196, 200 (e.g., an LED) to blink red or green when the relay contact has opened and the load disconnected. In another example, one of the optical elements 196, 200 may return to a solid red or green color according to a current programmed state or "power on" or "power off". In another example, one of the optical elements 196, 200 may revert to a previous solid color when reconnected and current draw is measured. In another example, the change in optical output by one of the optical elements 196, 200 may revert to the original optical output upon a user acknowledgement. In another example, the control algorithm may trigger one of the optical elements 196, 200 to blink red or green when the relay contact has closed.

Figure 4:
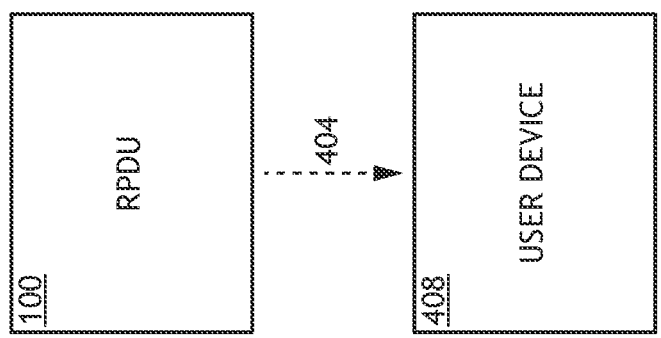
FIG. 4 is a block diagram illustrating a RPDU providing an event notification to a user device, in accordance with one or more embodiments of the disclosure.

Referring to FIG. 4, a block diagram illustrating a RPDU providing an event notification to a user device, in accordance with one or more embodiments of the disclosure, is shown. In some embodiments, a relay contact opening/closing may trigger an event notification 404 that is sent to a user device 408 (e.g., computer, tablet, or smartphone), as shown in FIG. 4. For example, the RPDU 100 may be configured to send an event notification 404 to a user device 408 (e.g., through wireless or wireline technologies) via Simple Network Management Protocol (SNMP), via a Graphical User Interface (GUI), web application, or other software protocol. The event notification 404 may include several data or records of the event. For example, the event notification 404 may include an image or descriptor of a voltage waveform present at the time the event occurred. For instance, an image of the voltage waveform may provide evidence to the user that the relay contact was closed at a voltage zero-crossing. The event notification 404 could be sent directly to an IT technician, an IT administrator, or to a third-party customer utilizing the server.

The ability of the RPDU 100 to detect when a load is connected or disconnected while the relay contact is open may be enabled by factory default, enabled by user prior to installation, or permanently enabled. For example, as an installer is commissioning the RPDU 100, the installer may plug in each load 304 in turn and sequentially move the load to different receptacles to establish the ideal balanced loading condition, all while continuously mitigating in-rush current.

Figure 5:
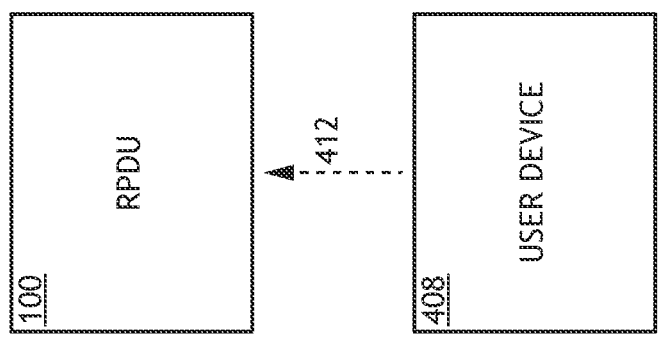
FIG. 5 is a block diagram illustrating a RPDU receiving a message from a user device, in accordance with one or more embodiments of the disclosure.

Referring to FIG. 5, a block diagram illustrating a RPDU receiving a message from a user device, in accordance with one or more embodiments of the disclosure, is shown. In some embodiments, the RPDU 100 is configured to receive a message 412 from the user device 408. For example, the RPDU 100 may receive a message 412 from the user device 408 (e.g., via a web application or other software) to restore power to the receptacle 192. This feature may be of particular use to RPDUs that are not configured (e.g., lacking the hardware configuration) to detect load status while the relay contact is open, but can receive firmware updates. Control algorithms uploaded in a firmware update may cause the RPDU 100 to gain the function of voltage zero-crossing prediction. A user then may send a message 412 to the RPDU 100 via the user device 408 to restore power to the receptacle 192 by closing the relay contact. In another example, an installer may send a message 412 to the RPDU 100 to turn off all receptacles 192 during installation. In this manner, the installer may plug in each load device while the RPDU 100 is plugged in and the relay contacts closed. While load devices are being plugged in, the RPDU 100 may then activate each corresponding receptacle at a voltage zero-crossing, avoiding in-rush current.

Figure 6:
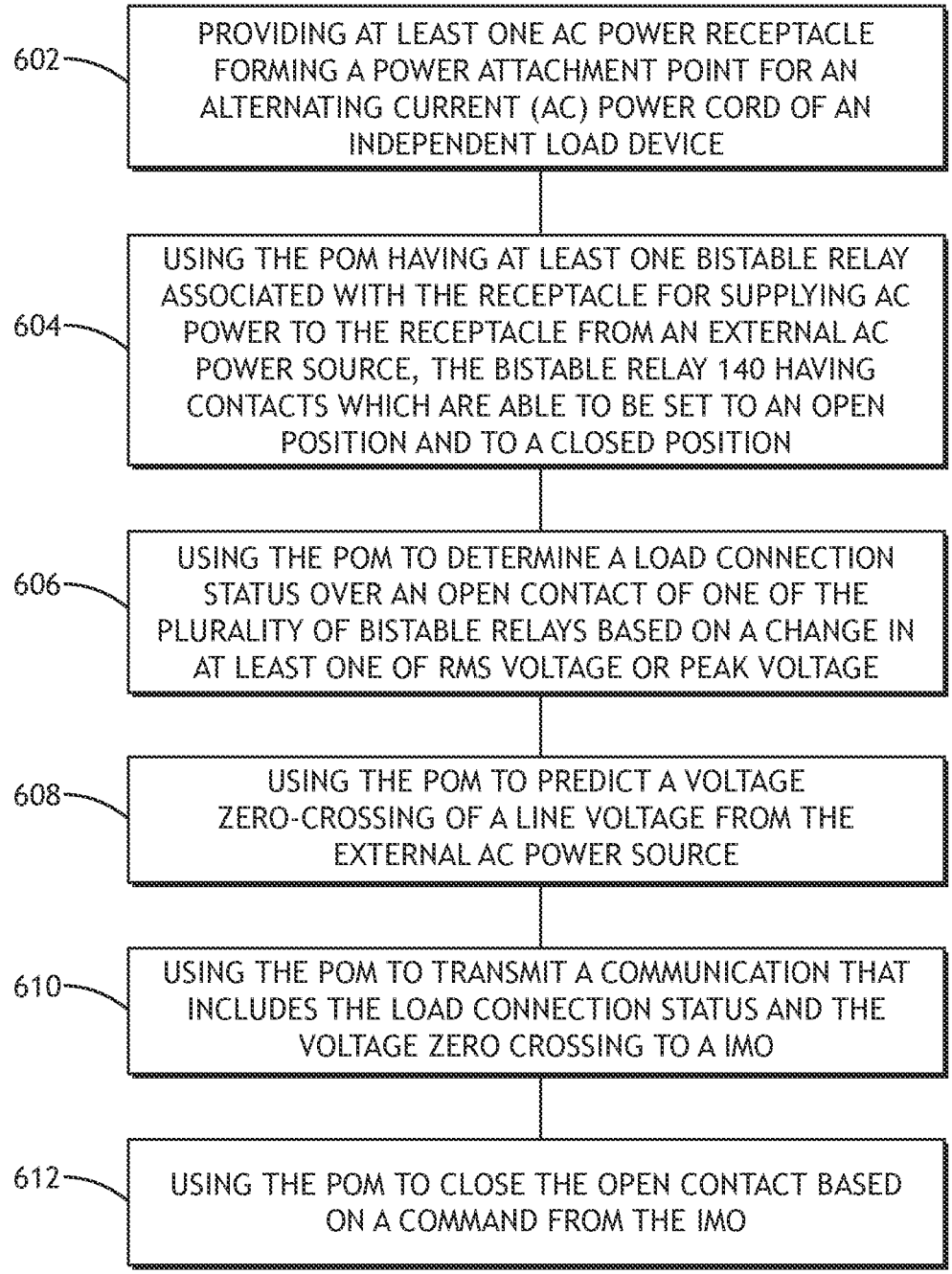
FIG. 6 is a flow diagram illustrating a method for monitoring and controlling an application of AC power to a plurality of load devices, in accordance with one or more embodiments of the disclosure.

Referring to FIG. 6, a flow diagram illustrating a method 600 for monitoring and controlling an application of AC power to a plurality of load devices, in accordance with one or more embodiments of the disclosure, is shown. The method 600 utilizes the RPDU 100 as described herein. Load devices may include any devices utilizing AC power including, but not limited to, servers.

In some embodiments, the method 600 includes a step 602 of providing at least one AC power receptacle 192 forming a power attachment point for an alternating current (AC) power cord of an independent load device. For example, the RPDU may comprise 120-volt outlets pluggable by power cords of server computers.

In some embodiments, the method 600 further includes a step 604 of using the POM 132 having at least one bistable relay 140 associated with the receptacle 192 for supplying AC power to the receptacle 192 from an external AC power source, the bistable relay 140 having contacts which are able to be set to an open position and to a closed position. The POM 132 is configured to switch the contact between open and closed positions.

In some embodiments, the method 600 further includes a step 606 of using the POM 132 to determine a load connection status over an open contact of one of the plurality of bistable relays 140 based on a change in at least one of RMS voltage or peak voltage. For example, the POM 132 may utilize control algorithms to determine whether the relay contact in open or closed in either load or no-load conditions, as demonstrated in FIG. 3A-C.

In some embodiments, the method 600 further includes a step 608 of using the POM 132 to predict a voltage zero-crossing of a line voltage from the external AC power source. As mentioned herein, control algorithms are used to coordinate with the line frequency to predict the timing of future voltage zero-crossings. For example, the RPDU 100 monitors the line frequency and may utilize stored zero-crossing voltage transition data to predict the next zero-crossing.

In some embodiments, the method 600 further includes a step 610 of using the POM 132 to transmit a communication that includes the load connection status and the voltage zero crossing to a IMD 104. Proper transitioning of power to a receptacle requires that the status of the relay contact and the timing of a future zero-crossing are known. These data are sent from the POM 132 to the IMD 104 so that a IMD 104 command can be generated.

In some embodiments, the method 600 further includes a step 612 of using the POM 132 to close the open contact based on a command from the IMD 104. For example, the IMD 104 may send a command to the POM 132 to close the relay contact at a specific time-frame at a predicted zero-crossing.

As described herein, the POM 132 may be configured to perform one or more, or all, functions of the IMD 104. For example, the POM 132 may be configured with the functionality to monitor the state the of one or more of the plurality of bistable relays 140 and close an open contact based on the determination of the load connection status and a predicted voltage zero crossing (e.g., without communicating with, or in the absence of, the IMD 104 and/or other circuitry). Therefore, the above description should not be interpreted as a limitation on the embodiments of the present disclosure but merely as an illustration.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be implemented (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be implemented, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

What is claimed:

1. A rack power distribution unit comprising:
   at least one power receptacle configured to enable attachment of an alternating current (AC) power cord of an external device to the power receptacle;
   a power output module (POM) having a plurality of bistable relays and associated with the at least one power receptacle for supplying AC power to the at least one power receptacle from an external AC power source, each of the bistable relays having contacts able to be set to an open position and to a closed position, the POM configured to:
   determine a load connection status over an open contact of one of the plurality of bistable relays based on a change in at least one of RMS voltage or peak voltage;
   predict a voltage zero-crossing of a line voltage from the external AC power source;
   transmit a communication that includes the load connection status and the voltage zero crossing to an interchangeable monitoring device (IMD); and
   close the open contact based on a command from the IMD; and
   the IMD, configured to:
   monitor a state of the bistable relays;
   receive the communication from the POM;
   command the POM to close the open contact based on the communication, wherein closing the open contact limits an in-rush of current to the rack power distribution unit.

2. The rack power distribution unit as claimed in claim 1, wherein the at least one AC power receptacle provides 120 volts.

3. The rack power distribution unit as claimed in claim 1, wherein the POM is configured to predict the voltage zero-crossing of the line voltage from the external AC power source by monitoring a line frequency of the line voltage.

4. The rack power distribution unit as claimed in claim 1, wherein the POM is configured to predict the voltage zero-crossing of the line voltage from the external AC power source by monitoring stored zero-crossing voltage transition data.

5. The rack power distribution unit of claim 1, wherein the POM utilizes one or more control algorithms to determine the load connection status over the open contact of one of the plurality of bistable relays based on the change in at least one of RMS voltage or peak voltage.

6. The rack power distribution unit of claim 5, wherein the one or more control algorithms is configured as firmware.

7. The rack power distribution unit of claim 1, wherein the POM is configured to determine the load connection status via a load detection circuitry.

8. The rack power distribution unit of claim 7, wherein the load detection circuity includes a plurality of resistors with known resistances and a difference amplifier configured to determine an output voltage based on a difference of two comparator voltages.

9. A method for monitoring and controlling an application of AC power to a plurality of load devices, the method comprising:
providing at least one AC power receptacle forming a power attachment point for an alternating current (AC) power cord of an independent load device;
using a power output module (POM) having at least one bistable relay associated with one of the at least one AC power receptacle for supplying AC power to the at least one AC power receptacle from an external AC power source, the bistable relay having contacts which are configured to be set to an open position and to a closed position;
using the POM to:
determine a load connection status over an open contact of one of a plurality of bistable relays based on a change in at least one of RMS voltage or peak voltage;
predict a voltage zero-crossing of a line voltage from the external AC power source;
transmit a communication that includes the load connection status; and
open or close the contact based on the load connection status.

10. The method as claimed in claim 9, wherein the at least one AC power receptacle provides 120 volts.

11. The method as claimed in claim 9, wherein the predict the voltage zero-crossing of the line voltage from the external AC power source includes monitoring a line frequency of the line voltage.

12. The method as claimed in claim 9, wherein the predict the voltage zero-crossing of the line voltage from the external AC power source includes monitoring stored zero-crossing voltage transition data.

13. A rack power distribution unit comprising:
at least one power receptacle configured to enable attachment of an alternating current (AC) power cord of an external device to the power receptacle;
a power output module (POM) having a plurality of bistable relays and associated with the at least one power receptacle for supplying AC power to the at least one power receptacle from an external AC power source, each of the bistable relays having contacts able to be set to an open position and to a closed position, the POM configured to:
monitor a state of one of the plurality of bistable relays;
determine a load connection status over an open contact of the one of the plurality of bistable relays based on a change in at least one of RMS voltage or peak voltage;
predict a voltage zero-crossing of a line voltage from the external AC power source; and
close the open contact based on a determination of the load connection status and a predicted voltage zero crossing.

14. The rack power distribution unit as claimed in claim 13, wherein the at least one AC power receptacle provides 120 volts.

15. The rack power distribution unit as claimed in claim 13, wherein the POM is configured to predict the voltage zero-crossing of the line voltage from the external AC power source by monitoring a line frequency of the line voltage.

16. The rack power distribution unit as claimed in claim 13, wherein the POM is configured to predict the voltage zero-crossing of the line voltage from the external AC power source by monitoring stored zero-crossing voltage transition data.

17. The rack power distribution unit of claim 13, wherein the POM utilizes one or more control algorithms to determine the load connection status over the open contact of one of the plurality of bistable relays based on the change in at least one of RMS voltage or peak voltage.

18. The rack power distribution unit of claim 17, wherein the one or more control algorithms is configured as firmware.

19. The rack power distribution unit of claim 13, wherein the POM is configured to determine the load connection status via a load detection circuitry.

20. The rack power distribution unit of claim 19, wherein the load detection circuity includes a plurality of resistors with known resistances and a difference amplifier configured to determine an output voltage based on a difference of two comparator voltages.

* * * * *